(12) United States Patent
McConnell et al.

(10) Patent No.: US 9,174,309 B2
(45) Date of Patent: Nov. 3, 2015

(54) TURBINE COMPONENT AND A PROCESS OF FABRICATING A TURBINE COMPONENT

(75) Inventors: Eric Eicher McConnell, Easley, SC (US); Stephen Gerard Pope, Roebuck, SC (US); Bill Damon Johnston, Easley, SC (US); John Gregory Obeirne, Greenville, SC (US)

(73) Assignee: General Electric Company, Schenectady, NY (US)

( * ) Notice: Subject to any disclaimer, the term of this patent is extended or adjusted under 35 U.S.C. 154(b) by 402 days.

(21) Appl. No.: 13/556,681

(22) Filed: Jul. 24, 2012

(65) Prior Publication Data

US 2014/0030548 A1     Jan. 30, 2014

(51) Int. Cl.
| | |
|---|---|
| *B23K 31/02* | (2006.01) |
| *B23K 35/30* | (2006.01) |
| *B23P 6/00* | (2006.01) |
| *B23P 15/00* | (2006.01) |
| *C22C 19/05* | (2006.01) |
| *F02M 61/18* | (2006.01) |
| *B23K 1/00* | (2006.01) |
| *B23K 9/23* | (2006.01) |
| *B23K 9/235* | (2006.01) |

(52) U.S. Cl.
CPC ........... *B23K 35/3033* (2013.01); *B23K 1/0018* (2013.01); *B23K 9/23* (2013.01); *B23K 9/235* (2013.01); *B23K 35/304* (2013.01); *B23P 6/002* (2013.01); *B23P 15/00* (2013.01); *C22C 19/056* (2013.01); *F02M 61/18* (2013.01); *B23K 2201/001* (2013.01); *B23P 6/007* (2013.01); *B23P 2700/13* (2013.01); *Y10T 428/12986* (2015.01)

(58) Field of Classification Search
None
See application file for complete search history.

(56) References Cited

U.S. PATENT DOCUMENTS

| | | | |
|---|---|---|---|
| 3,674,979 A | 7/1972 | Cape | |
| 4,232,527 A * | 11/1980 | Reider | ............................ 60/754 |
| 4,611,744 A * | 9/1986 | Fraser et al. | .................. 228/119 |
| 4,832,252 A * | 5/1989 | Fraser | ........................... 228/119 |
| 5,060,842 A * | 10/1991 | Qureshi et al. | ................ 228/119 |

(Continued)

FOREIGN PATENT DOCUMENTS

| | | |
|---|---|---|
| EP | 2343149 A1 | 7/2011 |
| EP | 2395199 A2 | 12/2011 |

(Continued)

OTHER PUBLICATIONS

Haynes International "High-Temperature Alloys" pp. 1-59, 2002.*

(Continued)

*Primary Examiner* — Kiley Stoner
(74) *Attorney, Agent, or Firm* — McNees Wallace & Nurick LLC

(57) ABSTRACT

A turbine component and a process of fabricating a component are disclosed. The process includes excavating a base metal of the component to form a fill region and filling the fill region with a filler metal. The filler metal has a filler metal elongation that is at least 25% greater than a base metal elongation of the base metal. The filler includes, by weight, between about 4% and about 7% iron, between about 14% and about 17% chromium, between about 15% and about 17% molybdenum, between about 3% and about 5% tungsten, up to about 0.02% carbon, up to about 1% manganese, up to about 2.5% cobalt, and a balance of nickel and/or the filler metal elongation is greater than about 35% in/in per two inches.

19 Claims, 2 Drawing Sheets

(56) References Cited

U.S. PATENT DOCUMENTS

| | | | |
|---|---|---|---|
| 5,297,390 A | 3/1994 | Sood | |
| 5,606,796 A * | 3/1997 | Fraser | 29/889.1 |
| 5,897,801 A | 4/1999 | Smashey et al. | |
| 5,914,055 A * | 6/1999 | Roberts et al. | 219/76.15 |
| 6,042,782 A * | 3/2000 | Murata et al. | 420/109 |
| 6,049,060 A * | 4/2000 | Smashey et al. | 219/137 R |
| 6,453,673 B1 | 9/2002 | Bechtel et al. | |
| 6,688,534 B2 | 2/2004 | Bretz | |
| 7,059,133 B2 | 6/2006 | Gerendas | |
| 7,658,076 B2 | 2/2010 | Hoffmann | |
| 8,235,275 B1 * | 8/2012 | Stankowski et al. | 228/56.3 |
| 8,637,166 B2 * | 1/2014 | Ayer et al. | 428/679 |
| 2001/0027966 A1 * | 10/2001 | Iwatsubo et al. | 219/137 WM |
| 2003/0005981 A1 * | 1/2003 | Ogawa et al. | 148/428 |
| 2004/0167442 A1 * | 8/2004 | Shireman et al. | 600/585 |
| 2005/0067466 A1 * | 3/2005 | Boegli et al. | 228/119 |
| 2005/0166987 A1 | 8/2005 | Matsubara et al. | |
| 2006/0163231 A1 * | 7/2006 | Kobayashi et al. | 219/146.23 |
| 2007/0090167 A1 * | 4/2007 | Arjakine et al. | 228/101 |
| 2007/0187379 A1 * | 8/2007 | Osuki et al. | 219/137 WM |
| 2007/0244414 A1 * | 10/2007 | Reynolds et al. | 600/585 |
| 2010/0021761 A1 * | 1/2010 | Ayer et al. | 428/660 |
| 2010/0064690 A1 * | 3/2010 | Bailey et al. | 60/734 |
| 2011/0049112 A1 * | 3/2011 | Johnson et al. | 219/121.64 |
| 2012/0100390 A1 * | 4/2012 | Kuroda et al. | 428/640 |
| 2012/0118936 A1 * | 5/2012 | Ikeda et al. | 228/56.3 |
| 2013/0160743 A1 * | 6/2013 | Sugihashi et al. | 123/456 |
| 2013/0181071 A1 * | 7/2013 | Johnston et al. | 239/589 |
| 2013/0200068 A1 * | 8/2013 | Hattendorf et al. | 219/553 |
| 2013/0205789 A1 * | 8/2013 | Johnston et al. | 60/740 |
| 2014/0120371 A1 * | 5/2014 | Mbacke et al. | 428/659 |
| 2014/0191017 A1 * | 7/2014 | Arjakine et al. | 228/119 |
| 2014/0212323 A1 * | 7/2014 | Honma et al. | 420/91 |

FOREIGN PATENT DOCUMENTS

| | | |
|---|---|---|
| GB | 1160836 A | 8/1969 |
| JP | 2001-107196 A * | 4/2001 |
| JP | 2012-061496 A * | 3/2012 |
| WO | 9322096 A2 | 11/1993 |

OTHER PUBLICATIONS

Search Report and Written Opinion from corresponding PCT Application No. PCT/US2013/046499 dated Oct. 2, 2013.

* cited by examiner

TURBINE COMPONENT AND A PROCESS OF FABRICATING A TURBINE COMPONENT

FIELD OF THE INVENTION

The present invention is directed to manufactured components and process of fabricating and repairing components. More specifically, the present invention is directed to turbine components and processes of fabricating turbine components.

BACKGROUND OF THE INVENTION

Gas turbines are increasingly being subjected to higher temperatures and/or increased temperature gradients in order to increase efficiency. Such temperature conditions can result in thermal fatigue. Some gas turbine components have geometric features, such as edges, that augment the effect of such temperature conditions.

Thermal fatigue can initiate/form cracks or other fatigue features, expand cracks or other fatigue features, and/or propagate/extend cracks or other fatigue features. Such cracks or other fatigue features can be undesirable for operational and/or cosmetic reasons. Often, such cracks or other fatigue features limit the capability of components and/or materials from being used under high temperatures and/or large temperature gradients.

Known processes include treating regions of components that are subjected to high temperatures or large temperature gradients. Some processes involve using high amounts of energy to modify the surface of such components, thereby resulting in an increased resistance to thermal fatigues. Such processes suffer from the drawback that they can be costly and can be limited in applicability based upon where such processes can be performed.

Other known processes include using a single material that is resistant to thermal fatigue. Such materials can be expensive and can include other properties that are not desirable. Previously, processes did not use multiple materials due to the additional steps and expense as well as potential compatibility issues associated with using multiple materials.

A turbine component and a process of fabricating a component not suffering from one or more of the above drawbacks would be desirable in the art.

BRIEF DESCRIPTION OF THE INVENTION

In an exemplary embodiment, a process of fabricating a component includes excavating a base metal of the component to form a fill region and filling the fill region with a filler metal. The filler metal has a filler metal elongation that is at least 25% greater than a base metal elongation of the base metal. The filler includes, by weight, between about 4% and about 7% iron, between about 14% and about 17% chromium, between about 15% and about 17% molybdenum, between about 3% and about 5% tungsten, up to about 0.02% carbon, up to about 1% manganese, up to about 2.5% cobalt, and a balance of nickel.

In another exemplary embodiment, a process of fabricating a component includes excavating a base metal of the component to form a fill region and filling the fill region with a filler metal. The filler metal has a filler metal elongation that is at least 25% greater than a base metal elongation of the base metal. The filler metal elongation is greater than about 35% in/in per two inches.

In another exemplary embodiment, a turbine component includes a base metal and a fill region including a filler metal. The filler metal has a filler metal elongation that is at least 25% greater than a base metal elongation of the base metal.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is an exemplary turbine component and process of fabricating components. Embodiments of the present disclosure increase operational efficiency, decrease cost of fabrication and/or repair of components, permit operation at higher temperatures and/or large temperature gradients, protect components having geometries susceptible to thermal fatigue, reduce or eliminate the initiation/formation of cracks or other fatigue features, reduce or eliminate the expansion of cracks or other fatigue features, reduce or eliminate the extension/propagation of cracks or other fatigue features, permit use of more than one material in components, or combinations thereof.

Figure 1:
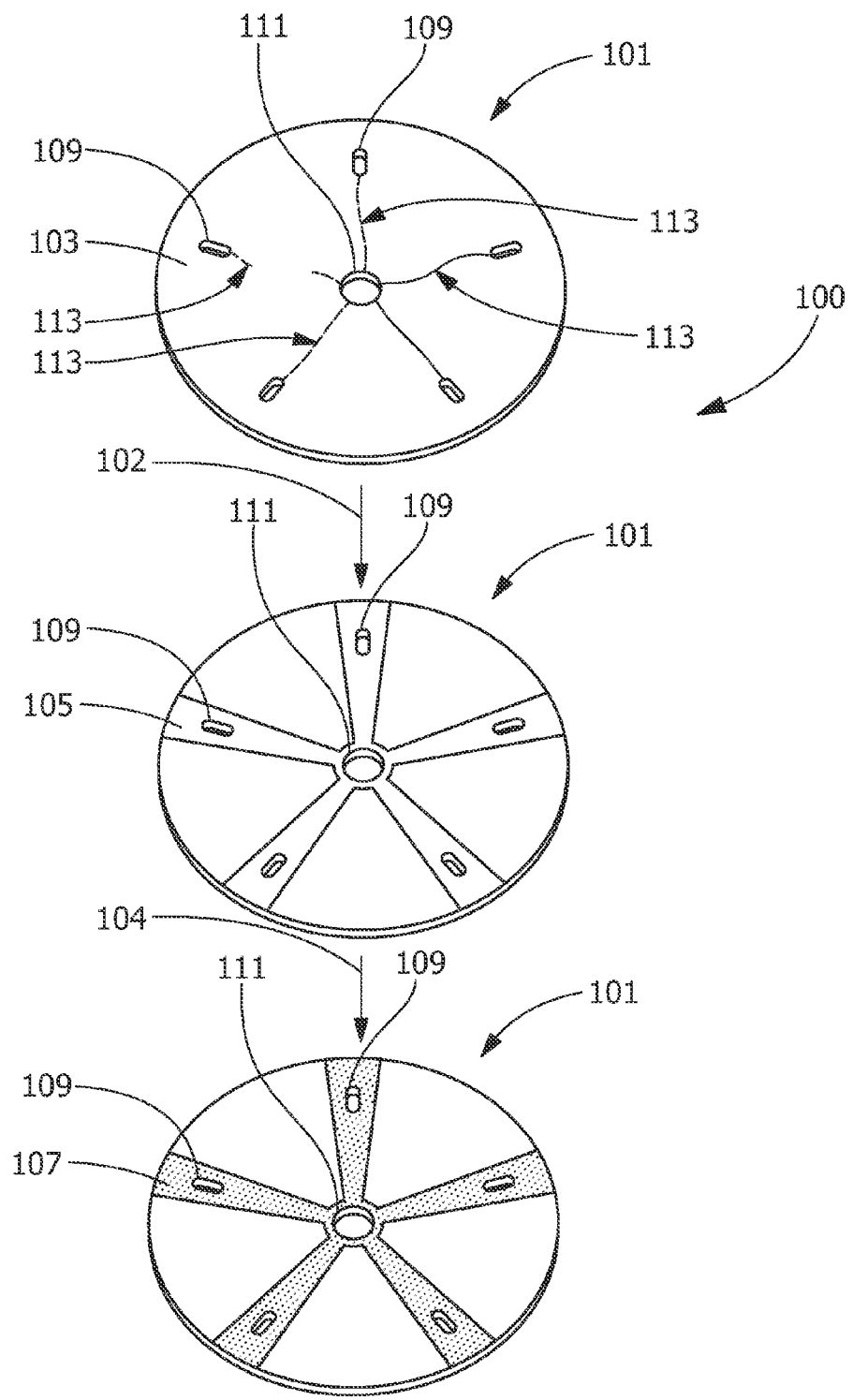
FIG. 1 is a schematic view of an exemplary process of fabricating an exemplary component according to the disclosure.

FIG. 1 illustrates a process 100 of fabricating a component, such as, a turbine component 101. The turbine component 101 includes a base metal 103. According to the process 100, the base metal 103 is excavated (step 102) and one or more fill regions 105 are formed. The fill region(s) 105 is then filled (step 104), for example, with a filler metal 107. The excavating (step 102) is by any suitable method capable of removing material from a defined region. Suitable methods of removing material include, but are not limited to, machining, grinding, ablating, filing, sawing, electrical discharge machining, or combinations thereof.

The turbine component 101 is any suitable component benefiting from properties associated with being filled (step 104). In one embodiment, the turbine component 101 is a fuel nozzle tip. In one embodiment, the turbine component 101 is a gas turbine component. In one embodiment, the turbine component 101 is a turbine engine component. Other suitable turbine components included, but are not limited to combustion cap assemblies and/or their sub-components, combustion liner assemblies and/or their sub-components, transition pieces and their sub-components, or combinations thereof.

The base metal 103 that is excavated (step 102) from the turbine component 101 is any suitable metal, metallic, or composite material. In one embodiment, the base metal 103 is cast metal. In one embodiment, the base metal 103 is hot-rolled metal. In one embodiment, the base metal 103 is bar metal. In one embodiment, the base metal 103 has a composition, by weight, of about between about 17% and about 24% chromium, between about 16% and about 20% iron, between about 8% and about 10% molybdenum, between about 1% and about 2% cobalt, between about 0.5% and about 0.7% tungsten, up to about 1% manganese, up to about 1% silicon, incidental impurities, and a balance of nickel. In another embodiment, the base metal 103 has a composition, by weight, of between about 0.04% and about 0.08% carbon, up to about 0.4% silicon, up to about 0.6% manganese, up to about 0.007% sulfur, up to about 0.0005 silver, up to about 0.6% aluminum, up to about 0.005% boron, up to about 0.0001 bismuth, between about 19% and about 21% cobalt, between about 19% and about 21% chromium, up to about 0.2% copper, up to about 0.7% iron, between about 5.6% and about 6.1% molybdenum, up to about 0.002% lead, between about 1.9% and about 2.4% titanium, between about 2.4% and about 2.8% aluminum/titanium, and a balance of nickel. In another embodiment, the base metal 103 has a composition, by weight, of between about 0.05% and about 0.15% carbon, up to about 1.3% manganese, between about 0.2% and about 0.5% silicon, up to about 0.02% phosphorus, up to about 0.015% sulfur, between about 21% and about 23% nickel, between about 13% and about 15% tungsten, between about 0.03% and about 0.12% lanthanum, up to about 0.015% boron, up to about 3% iron, and a balance of cobalt.

Figure 2:
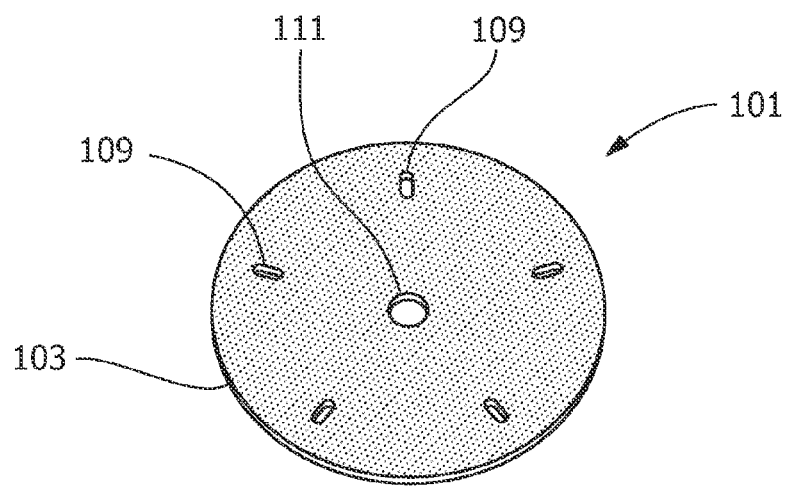
FIG. 2 is an exemplary turbine component according to the disclosure.

The fill region 105 that is formed within the base metal 103 of the turbine component 101 has a geometry permitting increased resistance to temperature differences upon being filled (step 104). The fill region 105 is defined by a removed region (not shown) that is excavated (step 102) from the base metal 103. In one embodiment, the removed region is sound material, for example, material substantially and/or completely devoid of fatigue features, asperities, and/or other undesirable results of extended operational use. In another embodiment, the removed region is a repair region, for example, having one or more fatigue features 113. In further embodiments, the removed region includes sound material and material having the fatigue feature(s) 113. FIG. 2 shows an embodiment of the turbine component 101 with the filler metal 107 covering the entire base metal 103 (other than a diffuser 109 and a combustion zone 111).

As shown in FIG. 1, in one embodiment, the fill region 105 is between a first zone, such as a region surrounding one or more of the diffusers 109 (for example, in a fuel nozzle tip), and a second zone, such as a region surrounding the combustion zone 111 (for example, in a fuel nozzle tip). In a further embodiment, the fill region 105 extends from the second zone in a plurality of directions, such as five, toward the first zone. In one embodiment, the first zone is resistant to and/or operates at a first temperature and the second zone is resistant to and/or operates at a second temperature that is greater than the first temperature by a temperature difference. The first temperature, the second temperature, and the temperature difference relate to the temperature of the base metal 103 and/or the filler metal 107, in contrast to an air temperature proximal to the diffuser(s) 109 and a flame temperature proximal to the combustion zone 111. In one embodiment, the air temperature and the combustion temperature, during operation, correspond with the first temperature, the second temperature, and a cold air stream. In one embodiment, the air temperature is about 1700° F., the combustion temperature is about 3000° F., and the cold air stream is about 200° F.

In one embodiment, the first temperature is at about 700° F., at about 800° F., at about 900° F., between 700° F. and about 900° F., between about 750° F. and about 850° F., between 750° F. and about 800° F., between about 800° F. and about 850° F., greater than about 750° F., greater than about 800° F., less than about 900° F., less than about 850° F., or any suitable range, sub-range, combination, or sub-combination thereof. Additionally or alternatively, in one embodiment, the second temperature is at about 1300° F., at about 1400° F., at about 1500° F., between 1300° F. and about 1500° F., between about 1350° F. and about 1450° F., between 1350° F. and about 1400° F., between about 1400° F. and about 1450° F., greater than about 1350° F., greater than about 1400° F., less than about 1500° F., less than about 1450° F., or any suitable range, sub-range, combination, or sub-combination thereof. In one embodiment, the temperature difference between the second temperature and the first temperature is about 500° F., about 600° F., about 700° F., between 500° F. and about 700° F., between about 550° F. and about 650° F., between 550° F. and about 600° F., between about 600° F. and about 650° F., greater than about 550° F., greater than about 600° F., less than about 700° F., less than about 750° F., or any suitable range, sub-range, combination, or sub-combination thereof.

Figure 3:
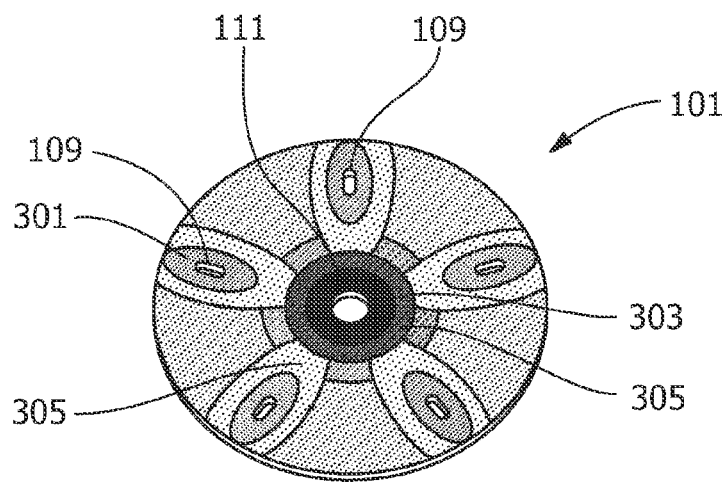
FIG. 3 is an exemplary turbine component according to the disclosure.

As shown in FIG. 3, in one embodiment, the turbine component 101 has a first temperature-resistant region 301, such as the region surrounding the diffuser(s) 109, and a second temperature-resistant region 303, such as the region surrounding the combustion zone 111. In operation of the turbine component 101, the first temperature-resistant region 301 is exposed to lower temperatures than the second temperature-resistant region 303, such as the first temperature and the second temperature described above. In a further embodiment, one or more intermediate temperature-resistant regions 305 extend between the first temperature-resistant region 301 and the second temperature-resistant region 303. In one embodiment, the fill region 105 corresponds with a portion or all of the first temperature-resistant region 301, the second temperature-resistant region 303, the intermediate temperature-resistant region(s) 305, or a combination thereof.

The fill region 105 is filled (step 104) with a filler metal 107, for example, after being cleaned or otherwise prepared. In one embodiment, the fill region 105 is filled (step 104) by welding. Suitable welding techniques include, but are not limited to, gas tungsten arc welding, metal inert gas welding, friction welding, brazing, or a combination thereof.

The filler metal 107 has a filler metal elongation that is at least 25% greater and/or at least 50% greater than a base metal elongation of the base metal 103. In further embodiments, the filler metal elongation is greater than about 40% in/in per two inches, greater than about 50% in/in per two inches, between about 35% and about 60% in/in per two inches, between about 40% and about 60% in/in per two inches, between about 50% and about 60% in/in per two inches, at about 40% in/in per two inches, at about 50% in/in per two inches, at about 59% in/in per two inches, or any suitable range, sub-range, combination, or sub-combination thereof. In one embodiment, the filler metal elongation is between about 9% and about 47% in/in per two inches.

In one embodiment, the filler metal 107 has a solution annealed microstructure. In one embodiment, the filler metal 107 includes, by weight, between about 4% and about 7% iron, between about 14% and about 17% chromium, between about 15% and about 17% molybdenum, between about 3% and about 5% tungsten, up to about 0.02% carbon, up to about 1% manganese, up to about 2.5% cobalt, and a balance of nickel. In one embodiment, the filler metal 107 has a composition, by weight, of about 0.005% C, 0.150% Mn, about 0.005% P, about 0.002% S, about 0.03% Si, about 15.50% Cr, about 16.0% Mo, about 3.50% W, about 0.15% V, about 0.10% Co, about 6.00% Fe, incidental impurities, and a balance of Ni.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process of fabricating a component, the component being a fuel tip nozzle, combustion cap assembly or transition component, comprising:
    excavating a base metal of the component to form a fill region, the fill region surrounding a combustion zone and extending in a plurality of directions along a surface of the component to surround one or more diffusers; and
    filling the fill region with a filler metal;
    wherein the filler metal has a filler metal elongation that is at least 25% greater than a base metal elongation of the base metal;
    wherein the filler has a composition, by weight, of about 0.005% C, 0.150% Mn, about 0.005% P, about 0.002% S, about 0.03% Si, about 15.50% Cr, about 16.0% Mo, about 3.50% W, about 0.15% V, about 0.10% Co, about 6.00% Fe, incidental impurities, and a balance of Ni.

2. The process of claim 1, wherein the filling is by welding.

3. The process of claim 2, wherein the welding is gas tungsten arc welding.

4. The process of claim 2, wherein the welding is metal inert gas welding.

5. The process of claim 2, wherein the welding is friction welding.

6. The process of claim 1, wherein the filling is by brazing.

7. The process of claim 1, wherein the filler metal has a solution annealed microstructure.

8. The process of claim 1, wherein the filler metal elongation is greater than about 35% for two inches.

9. The process of claim 1, wherein the first region is resistant to higher temperatures than the second region.

10. The process of claim 1, wherein a region removed by the excavating of the base metal is a material substantially or completely devoid of fatigue features, asperities, or other undesirable results of extended operation.

11. The process of claim 1, wherein a repair region is removed by the excavating of the base metal, the repair region having one or more fatigue features.

12. The process of claim 1, wherein the base metal is a cast metal.

13. The process of claim 1, wherein the base metal is a hot-rolled metal.

14. The process of claim 1, wherein the base metal is a bar metal.

15. The process of claim 1, wherein the component is a gas turbine component.

16. The process of claim 1, wherein the component is a turbine engine component.

17. The process of claim 1, wherein the article is a fuel nozzle tip.

18. The process of claim 1, wherein the article is a transition component having a diffuser portion and a combustion portion.

19. A process of fabricating a component, the component being a fuel tip nozzle, combustion cap assembly or transition component, comprising:
    excavating a base metal of the component to form a fill region, the fill region surrounding a combustion zone and extending in a plurality of directions along a surface of the component to surround one or more diffusers; and
    filling the fill region with a filler metal;
    wherein the filler metal has a filler metal elongation that is at least 25% greater than a base metal elongation of the base metal;
    wherein the filler metal elongation is greater than about 35% per two inches.

* * * * *